US012705795B2

(12) United States Patent
Gao et al.

(10) Patent No.: US 12,705,795 B2
(45) Date of Patent: Aug. 11, 2026

(54) METHOD FOR DETERMINING THE POSE OF A TARGET OBJECT IN AN IMAGE

(71) Applicant: Robert Bosch GmbH, Stuttgart (DE)

(72) Inventors: Ning Gao, Nufringen (DE); Gerhard Neumann, Karlsruhe (DE); Anh Vien Ngo, Nehren (DE); Hanna Ziesche, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 18/662,002

(22) Filed: May 13, 2024

(65) Prior Publication Data

US 2024/0394917 A1 Nov. 28, 2024

(30) Foreign Application Priority Data

May 26, 2023 (EP) .................................... 23175796

(51) Int. Cl.

| | |
|---|---|
| ***G06T 7/73*** | (2017.01) |
| ***G06T 7/11*** | (2017.01) |
| ***G06T 7/33*** | (2017.01) |
| ***G06T 7/62*** | (2017.01) |

(52) U.S. Cl.

CPC .................. *G06T 7/75* (2017.01); *G06T 7/11* (2017.01); *G06T 7/344* (2017.01); *G06T 7/62* (2017.01); *G06T 2207/20081* (2013.01)

(58) Field of Classification Search

CPC ..... G06T 7/75; G06T 7/62; G06T 7/11; G06T 7/344

See application file for complete search history.

(56) References Cited

U.S. PATENT DOCUMENTS

| | | | | |
|---|---|---|---|---|
| 10,186,038 | B1 * | 1/2019 | Kluckner | G06T 7/70 |
| 10,210,382 | B2 * | 2/2019 | Shotton | G06F 3/017 |
| 10,235,771 | B2 * | 3/2019 | Rad | G06V 20/20 |
| 10,885,659 | B2 * | 1/2021 | Li | G06T 7/55 |
| 2011/0267344 | A1 | 11/2011 | Germann et al. | |
| 2014/0219550 | A1 | 8/2014 | Popa et al. | |
| 2018/0137644 | A1 * | 5/2018 | Rad | G06V 10/242 |
| 2018/0144458 | A1 * | 5/2018 | Xu | H04N 13/271 |

(Continued)

OTHER PUBLICATIONS

Germann et al., "Articulated Billboards for Video-Based Rendering," Eurographics, vol. 29, No. 2, 2010, pp. 585-594.

*Primary Examiner* — Mohammed H Zuberi

(74) *Attorney, Agent, or Firm* — Norton Rose Fulbright US LLP

(57) ABSTRACT

A method for determining the pose of a target object in an input image. The method includes: providing a set of reference images that contain the target object and are annotated with the respective pose of the target object; inputting the reference images to a segmentor that is configured to distinguish parts and/or features of an image belonging to different objects; determining a canonical object model that pools information from the reference images in one common coordinate system; determining a representation of the target object in the output space of the segmentor; inputting the input image to the segmentor, and determining which parts of a resulting output of the segmentor belong to the target object; combining the parts belonging to the target object into a local reconstruction of the target object; and evaluating the sought pose of the target object in the input image.

12 Claims, 4 Drawing Sheets

Fig. 1B

(56) References Cited

U.S. PATENT DOCUMENTS

| | | | | |
|---|---|---|---|---|
| 2018/0268601 | A1* | 9/2018 | Rad | G06V 20/647 |
| 2020/0020117 | A1* | 1/2020 | Daehler | G06T 11/20 |
| 2022/0101555 | A1* | 3/2022 | Zhang | G06T 7/74 |

* cited by examiner

METHOD FOR DETERMINING THE POSE OF A TARGET OBJECT IN AN IMAGE

CROSS REFERENCE

The present application claims the benefit under 35 U.S.C. § 119 of European Patent Application No. EP 23 17 5796.4 filed on May 26, 2023, which is expressly incorporated herein by reference in its entirety.

FIELD

The present invention relates to the field of image analysis, and in particular to detecting of the pose of a target object in an image.

BACKGROUND INFORMATION

In three-dimensional Cartesian space, the position of an object is characterized by three coordinates, and the orientation of the object is characterized by three rotation angles with respect to three axes. The position and orientation make up the pose of the object, which is also termed 6D pose due to the six available degrees of freedom.

Like for many other imaging tasks, machine learning models may be used for the task of detecting the pose of a target object in an input image. However, although achieving satisfying performance, such machine learning models are prone to overfit to specific objects and thus suffer from poor generalization to unseen objects. Improving the generalization to previously unseen objects requires at least some information about the unseen objects at best, and an at least partial retraining of the model at worst.

SUMMARY

The present invention provides a method for determining the pose of a target object in an input image. The input image may be acquired using any suitable imaging device, such as a still camera, a video camera, a thermal camera, an ultrasound imaging device, an X-ray imaging device, or a tomographic imaging device.

According to an example embodiment of the present invention, the method starts with providing a set of reference images that contain the target object and are annotated with the respective pose of the target object. This is the only information about the target object that is needed. In particular, it is not necessary to know the type or the size of the target object.

The references are inputted to at least one segmentor. The at least one segmentor is configured to distinguish parts and/or features of an image belonging to different objects. From the output of the at least one segmentor that is obtained for the multiple reference images, a canonical object model is obtained. This canonical object model pools information from the reference images in one common coordinate system. That is, from each reference image that contains information in a coordinate system different from the common coordinate system, the creation of the canonical object model derives information about a hypothetical object that is in the common coordinate system.

Furthermore, from the output of the at least one segmentor in combination with the annotation of the reference images, a representation of the target object in the output space of at least one segmentor is determined. That is, this representation not only contains the information from the reference images themselves, but also ground truth information with respect to the pose of the target object in the reference images.

The input image is also inputted to the at least one segmentor, so that the at least one segmentor produces an output. Based on a comparison of this output on the one hand and the previously obtained representation of the target object on the other hand, it is determined which part of the output of the at least one segmentor obtained for the input image belong to the target object.

The parts of the output belonging to the target object are combined into a local reconstruction of the target object. From a comparison of this local reconstruction on the one hand, and the canonical object model on the other hand, the sought pose of the target object in the input image is determined. That is, the determination which parts of the input image actually belong to the target object is made in the output space of the at least one segmentor. In particular, this output space may comprise a semantic segmentation map that assigns, to each pixel of the input image, a type of object to which this pixel belongs. But the output space is not limited to this. Alternatively or in combination, the output space may contain richer information, such as a set of features per image pixel. The local reconstruction is no longer in said output space; rather, it is in the space of the canonical object model. That is, after combining parts of the output of the at least one segmentor, a local reconstruction in the space of the object model that is in agreement with the combined parts of the output is obtained. The evaluation of the sought pose of the target object is performed in the space of the object model.

It was found that an accurate determination which parts of the input image actually belong to the target object is very important for the accuracy of the finally determined pose. In particular, if the input image contains a cluttered scene with many objects, other objects in the vicinity of the target object may have a completely different pose. If parts of such other objects are incorrectly determined to belong to the target object, said completely different pose may "poison" the finally determined pose of the target object. Removing parts not actually belonging to the target object from the pose determination thus greatly improves the finally obtained accuracy. It was found that the proposed analysis in the output space of the segmentor provides for a much better separation of the target object from other objects, in particular in cluttered scenes where other objects partially occlude the target object.

In a particularly advantageous example embodiment of the present invention, the at least one segmentor comprises:

- a first, coarse segmentor $\varphi$ that is configured to determine sets of pixels of the image belonging to different objects, and
- a second, dense segmentor $\varphi^*$ that is configured to determine a set of features for each pixel of the image.

In this manner, the coarse segmentor $\varphi$ may divide the input image into "patches" that belong to different objects. The dense segmentor $\varphi^*$ may then output features that can be used to unambiguously decide which patches belong to the target object. That is, the features outputted by the dense segmentor $\varphi^*$ may serve as a "fingerprint" to distinguish the target object from other objects.

Moreover, in such an arrangement, the dense segmentor $\varphi^*$ may be trained or fine-tuned in a few-shot manner based on a few reference images, while the coarse segmentor $\varphi$ remains frozen in a previously trained state. For example, the coarse segmentor $\varphi$ may have been generically trained on a large training dataset.

In a further particularly advantageous example embodiment of the present invention, in the course of determining the representation of the target object, it is determined, for each set of pixels ("patch") belonging to an object according to the coarse segmentor φ, based on the annotation of the respective reference image, whether this set of pixels belongs to the target object. If this is the case, the set of pixels is a "positive segment"; otherwise, the set of pixels is a "negative segment". If the set of pixels is a "positive segment", an aggregate (e.g., an average) of the features outputted by the dense segmentor φ* is computed over all pixels in the set as a positive object level representation. Likewise, if the set of pixels is a "negative segment", an aggregate (e.g., an average) of the features outputted by the dense segmentor φ* may be computed over all pixels in the set as a negative object level representation.

An aggregate (e.g., an average) of the positive object level representations is then computed as the representation of the target object. In this manner, information from multiple patches that belong to the target object may be pooled even if these multiple patches are not connected. This may, for example, happen if the target object is partially occluded in the reference images.

In a further particularly advantageous example embodiment of the present invention, parameters that characterize the behavior of the dense segmentor φ* are optimized towards the goal of maximizing a pairwise similarity between the positive object level representations. The goal may also include maximizing a pairwise dissimilarity between positive object level representations on the one hand and negative object level representations on the other hand. This makes the optimization goal a "contrastive" goal.

For example, given M reference images, a set of positive target object representations $P=\{p_1, \ldots, p_M\}$ and a set of negative target object representations $N=\{n_1, \ldots, n_K\}$ may be obtained. Herein, K is random and depends on the number of predicted segments from the reference images. For each positive pair $p_i$ and $p_j$, a contrastive loss may be computed as $$l_{ij} = -\log \frac{\exp\left(sim(p_i, p_j)/\tau\right)}{\sum_{q \in N \cup \{p_j\}} \exp\left(sim(p_i, q)/\tau\right)},$$

wherein τ is a hyper-parameter and sim is a similarity metric. The total contrastive loss L is summed over all positive pairs $p_i$ and $p_j$ and backpropagated through φ* to yield updates for its parameters. After the optimization has finished, the dense segmentor φ* may generate the representation of the target object by averaging the pixel-wise features over all positive segments.

In particular, the optimizing may start from a copy of the coarse segmentor φ. In this manner, the training of the dense segmentor φ* does not start from scratch. Rather, it is a mere adaptation in a few-shot manner based on the few reference images.

In a further particularly advantageous example embodiment of the present invention, the comparison of the output of the at least one segmentor comprises computing, for each set of pixels belonging to an object according to the coarse segmentor φ, an aggregate of the features outputted by the dense segmentor φ* over all pixels in the set as a candidate representation. The similarity between each such candidate representation and the previously determined representation of the target object is then evaluated. For example, this may be performed using the cosine similarity. The candidate representation for which the similarity is highest is determined as a part of the output of the segmentor φ* that belongs to the target object. In this manner, given an input image, a patch of the input image that is most likely to belong to the target object and also provide salient information on its pose is selected. In particular, by measuring the similarity with the representation of the target object in feature space, the image quality within the patch goes into the selection of the most salient patch as well. For example, if a patch of the input image belongs to the target object, but suffers from a low quality because of overexposure, underexposure or motion blur, it may be advantageous to select another patch that also belongs to the target object but has a better quality.

In a further particularly advantageous example embodiment of the present invention, in the course of evaluating the sought pose, a region of interest in the input image that is most salient for the evaluating of the sought pose may be determined based at least in part on the object model and the local reconstruction. This region of interest is then preferred in the evaluation of the sought pose. In this manner, the accuracy of the determined pose is improved because the most reliable information from the input image has the strongest say regarding the finally determined pose. In particular, "preferring" may mean attributing a higher weight to information from the region of interest, up to the point that information from input image areas outside the region of interest is not considered at all for the determining of the pose.

In a further particularly advantageous example embodiment of the present invention, parametrized rotations R and/or translations T are applied to the object model, and/or to the local reconstruction. Parameters of the rotations R and/or translations T are optimized towards the goal of improving the match between the object model and the local reconstruction. The optimal rotations R and/or translations T determined in this manner may be exploited for determining an estimate of the pose, and/or of the region of interest. For example, the Iterative Closest Point, ICP, algorithm may be used to bring the object model and the local reconstruction into alignment.

In particular, the region of interest may be determined based at least in part on:

- an estimate $\hat{d}$ of the diameter of the target object derived from the object model;
- an optimal translation $$T_z^*$$

perpendicular to the image plane; and

- a focal length $f$ of the camera used to acquire the input image.

In this manner, no prior knowledge about the size of the target object is necessary. From the estimate $\hat{d}$ of the diameter and the optimal translation $$T_z^*$$

perpendicular to the image plane that serves as depth information, the scale s of the region of interest may be computed as $$s = \hat{d} \cdot \frac{f}{T_z^*}.$$

With the optimal translations $$T_x^*$$

and $$T_y^*$$

in the image plane, the position [u, v] of the region of interest may be computed as $$u = T_x^* \cdot \frac{f}{T_z^*} \text{ and}$$

$$v = T_y^* \cdot \frac{f}{T_z^*}.$$

In a further particularly advantageous example embodiment of the present invention, in the course of evaluating the sought pose, a map of detection scores in the determined region of interest may be computed using a given object detector. The determined pose may then be updated based on a pixel in the map of detection scores with a highest detection score. By limiting the evaluation of the score map to the region of interest, a mis-detection of spurious peaks in the score map as the target object is avoided. Without a region of interest, selecting a highest score from the score map is prone to selecting a wrong target object.

In a further particularly advantageous example embodiment of the present invention, after the updating of the determined pose based on the detection map, the rotations R and/or translations T are optimized further towards the goal of improving the match between the object model and the local reconstruction. In particular, to this end, the Iterative Closest Point, ICP, algorithm may be used again. The determined pose may then be updated based on the outcome of this further optimizing. In this manner, a tendency of the first optimization of the rotations R and/or translations T to get stuck in a locally optimal 6D pose estimation without a good initialization is avoided.

In a further particularly advantageous example embodiment of the present invention, from the determined pose of the target object, an actuation signal is computed. A vehicle, a robot, a driving assistance system, a surveillance system, a quality assurance system, and/or a medical imaging system, is then actuated with the actuation signal. Because the pose is now determined with a better accuracy, the probability that the reaction performed by the actuated technical system in response to the actuation signal is appropriate in the situation denoted by the input image is improved.

The method may be wholly or partially computer-implemented and embodied in software. The present invention therefore also relates to a computer program with machine-readable instructions that, when executed by one or more computers and/or compute instances, cause the one or more computers and/or compute instances to perform the method of the present invention described above. Herein, control units for vehicles or robots and other embedded systems that are able to execute machine-readable instructions are to be regarded as computers as well. Compute instances comprise virtual machines, containers or other execution environments that permit execution of machine-readable instructions in a cloud.

A non-transitory storage medium, and/or a download product, may comprise the computer program. A download product is an electronic product that may be sold online and transferred over a network for immediate fulfilment. One or more computers and/or compute instances may be equipped with said computer program, and/or with said non-transitory storage medium and/or download product.

In the following, the present invention will be described using Figures without any intention to limit the scope of the present invention.

DETAILED DESCRIPTION OF EXAMPLE EMBODIMENTS

Figure 1A:
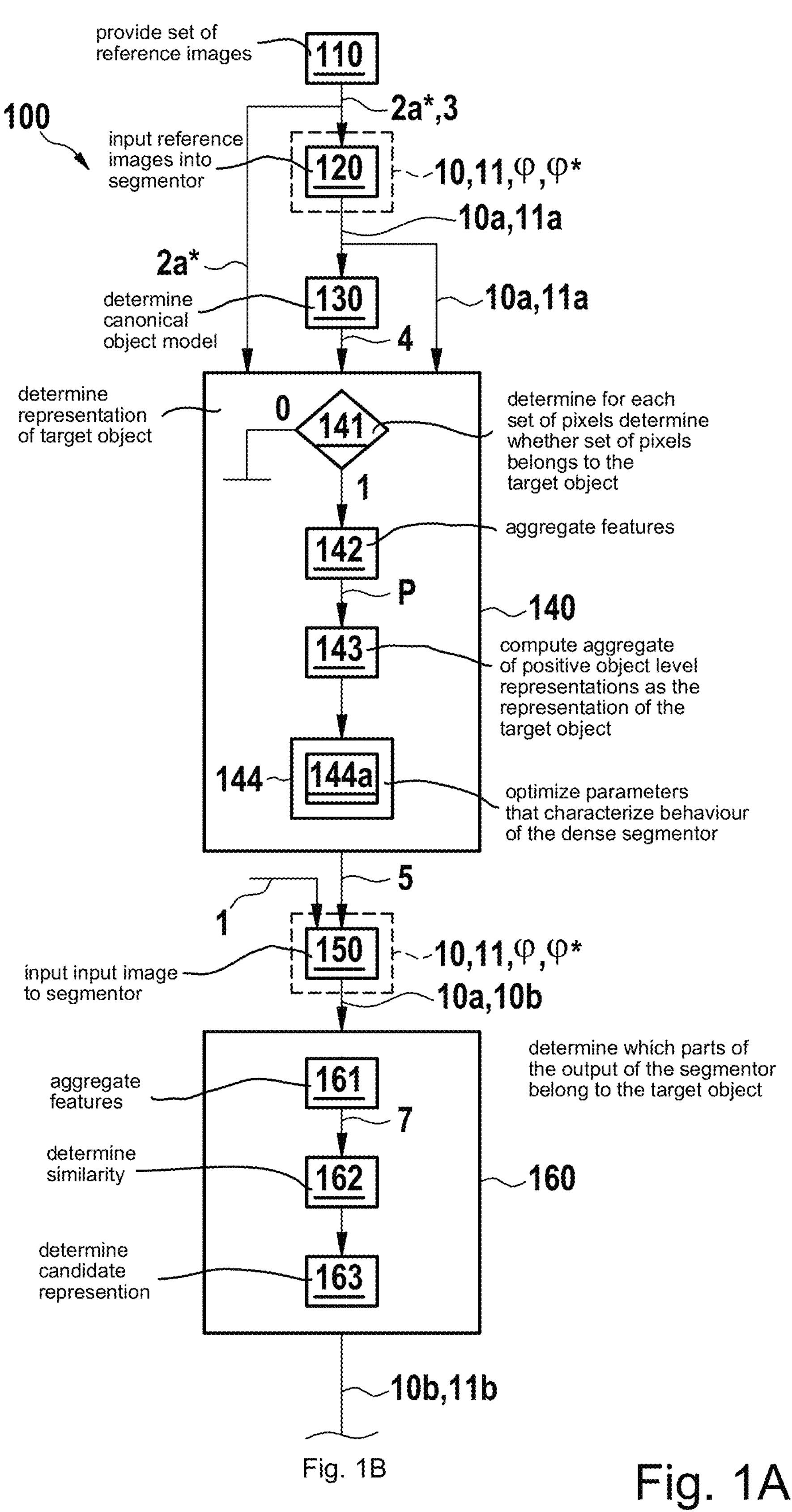
FIGS. 1A and 1B, together, show an exemplary embodiment of the method 100 for determining the pose 2*a* of a target object 2.
Figure 1B:
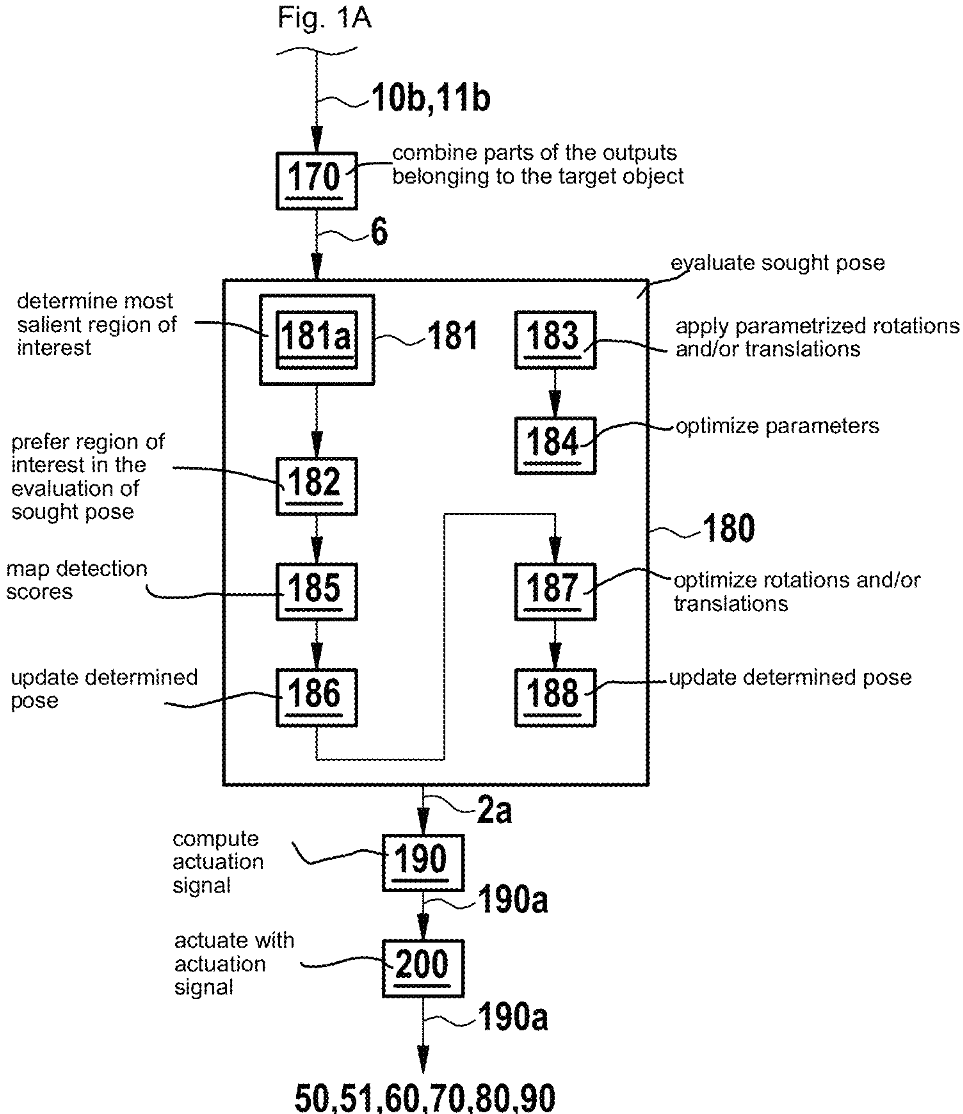

FIGS. 1A and 1B, together, show a schematic flow chart of an embodiment of the method 100 for determining the pose 2*a* of a target object 2 visible in an input image 1.

In step 110, a set of reference images 3 that contain the target object 2 is provided. These reference images 3 are annotated with the respective pose 2*a of the target object 2. In step 120, the reference images 3 are inputted to at least one segmentor 10, 11, that is configured to distinguish parts and/or features of an image belonging to different objects. In particular, the first segmentor 10 may be a coarse segmentor φ that is configured to determine sets of pixels of the image belonging to different objects, and the second segmentor 11** may be a dense segmentor φ* that is configured to determine a set of features for each pixel of the image.

In step 130, from the output 10*a*, 11*a* of the at least one segmentor 10, 11, a canonical object model 4 that pools information from the reference images 3 in one common coordinate system is determined.

In step 140, from the output 10*a*, 11*a* of the at least one segmentor 10, 11 in combination with the annotation 2*a of the reference images 3, a representation 5 of the target object 2 in the output space of at least one segmentor 10, 11** is determined.

According to block 141, for each set of pixels belonging to an object according to the coarse segmentor φ, 10, it may be determined, based on the annotation 2*a of the respective reference image 3, whether this set of pixels belongs to the target object 2. If this is the case (truth value 1), according to block 142**, an aggregate of the features outputted by the dense segmentor φ* may be computed over all pixels in the set as a positive object-level representation P. According to block 143, an aggregate of the positive object level representations P may then be computed as the representation 5 of the target object 2.

According to block 144, parameters that characterize the behavior of the dense segmentor φ*, 11 may be optimized towards the goal of maximizing a pairwise similarity between the positive object level representations P. According to block 144*a*, such optimizing may start from a copy of the coarse segmentor φ, 10.

In step 150, the input image 1 is inputted to the at least one segmentor 10, 11, which produces an output 10*b*, 11*b*.

In step 160, based on a comparison of said output 10*b*, 11*b* of the at least one segmentor 10, 11 and the representation 5 of the target object 2, it is determined which parts 10*c*, 11*c* of said output 10*b*, 11*b* of the at least one segmentor 10, 11 belong to the target object 2.

According to block 161, when comparing the output 10*a*, 11*a* of the at least one segmentor 10, 11 obtained for the input image 1 and the representation 5 of the target object 2, for each set of pixels belonging to an object according to the coarse segmentor φ, an aggregate of the features outputted by the dense segmentor φ* over all pixels in the set may be computed as a candidate representation 7.

According to block 162, the similarity between each candidate representation 7 and the representation 5 of the target object 2.

According to block 163, the candidate representation 7 for which the similarity is highest may be determined as a part of the output of the segmentor φ*, 11 that belongs to the target object 2.

In step 170, the parts 10*c*, 11*c* of the outputs 10*b*, 11*b* belonging to the target object 2 are combined into a local reconstruction 6 of the target object 2.

In step 180, from a comparison of the local reconstruction 6 and the canonical object model 4, the sought pose 2*a* of the target object 2 in the input image 1 is evaluated.

According to block 181, based at least in part on the object model 4 and the local reconstruction 6, a region of interest 8 in the input image 1 that is most salient for the evaluating of the sought pose 2*a* may be determined.

According to block 181*a*, the region of interest 8 may determined based at least in part on:

- an estimate $\hat{d}$ of the diameter of the target object derived from the object model (4);
- an optimal translation $$T_z^*$$

perpendicular to the image plane; and

- a focal length $f$ of the camera used to acquire the input image 1.

According to block 182, this region of interest 8 may be preferred in the evaluation of the sought pose 2*a*.

According to block 183, parametrized rotations R and/or translations T may be applied to the object model 4, and/or to the local reconstruction 6. According to block 184, parameters of the rotations R and/or translations T may then be optimized towards the goal of improving the match between the object model 4 and the local reconstruction 6.

According to block 185, if a region of interest 8 has been determined, a map 9*a* of detection scores in the determined region of interest 8 may be computed using a given object detector. The determined pose 2*a* may then be updated (block 186) based on a pixel in the map of detection scores with a highest detection score.

According to block 187, the rotations R and/or translations T may then be further optimized towards the goal of improving the match between the object model 4 and the local reconstruction 6. Based on the outcome of this further optimizing, according to block 188, the determined pose 2*a* may be updated.

In step 190, an actuation signal 190*a* may be computed from the determined pose 2*a*.

In step 200, a vehicle 50, a robot 51, a driving assistance system 60, a surveillance system 70, a quality assurance system 80, and/or a medical imaging system 90, is actuated with the actuation signal 190*a*.

Figure 2:
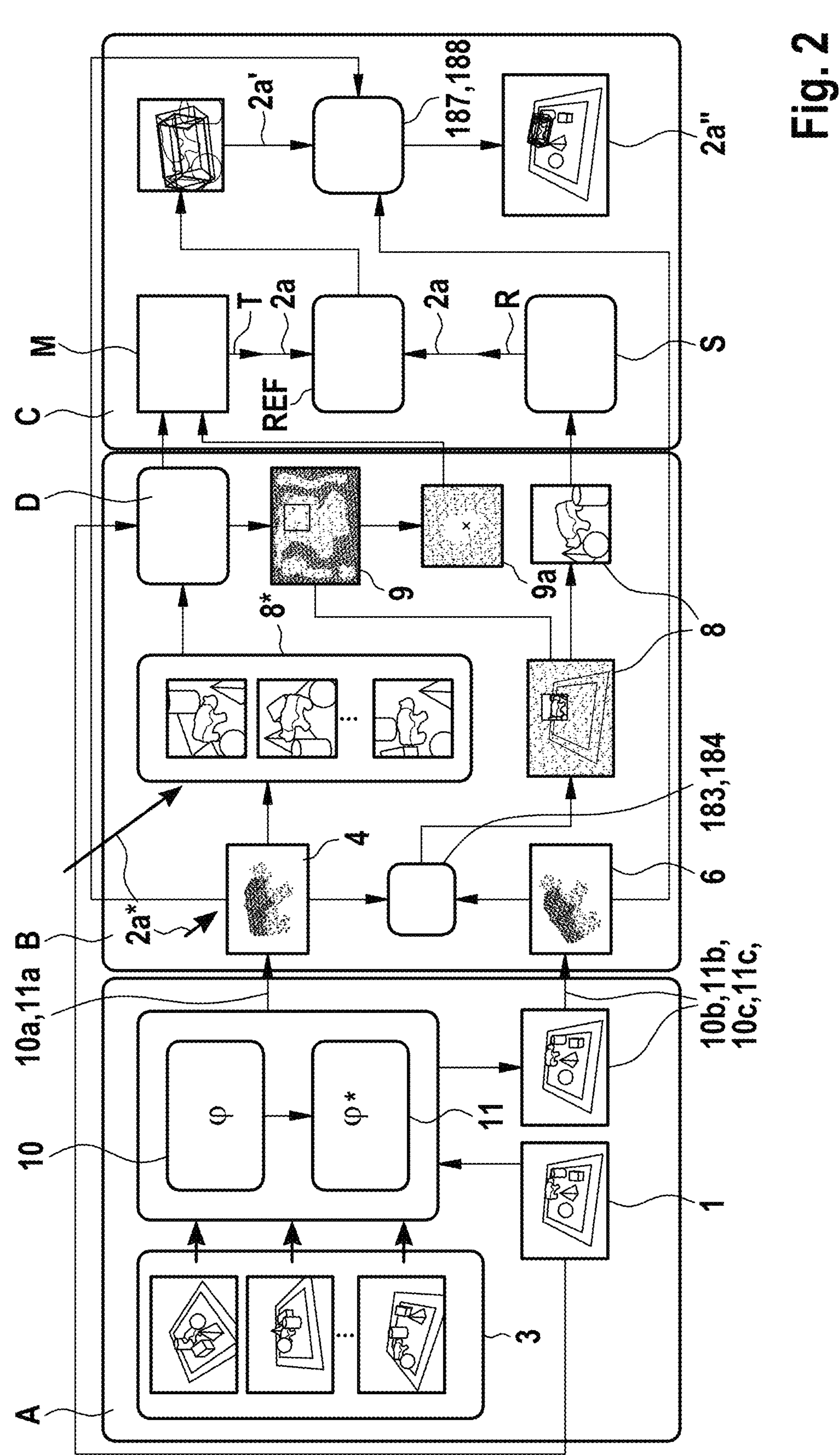
FIG. 2 shows an illustration of an exemplary pose estimation pipeline to implement the method 100 including region proposal and refinement.

FIG. 2 is a block chart of an exemplary pose estimation pipeline to implement the method 100. The pipeline comprises an online self-adaptation module A, a region proposal module B, and a refinement module C.

The online self-adaptation module A comprises a first, coarse segmentor φ, 10 that is configured to determine sets of pixels of an image belonging to different objects, as well as a second, dense segmentor φ*, 11 that is configured to determine a set of features for each pixel of the image.

When this combination of segmentors is used on reference images 3 with the target object 2, the resulting outputs 10*a*, 11*a* may be used to construct a canonical object model 4. When the combination of segmentors is used on the input image 1, the resulting outputs 10*b*, 11*b* may be analyzed as to which parts 10*c*, 11*c* belong to the target object 2. Out of these parts 10*c*, 11*c*, a local reconstruction 6 of the target object 2 may be constructed. In step 180 of the method 100, from a comparison of the local reconstruction 6 and the canonical object model 4, the sought pose 2*a* of the target object 2 in the input image 1 is evaluated.

To this end, in the region proposal module B in the exemplary pipeline shown in FIG. 2, in steps 183 and 184 of the method 100, parametrized rotations R and/or translations T are applied to the object model 4, and/or to the local reconstruction 6, to bring both into a best alignment. This may be used to predict a region of interest, ROI 8 that is most salient for determining the sought pose 2*a*. Based on this region of interest 8, and features of a cropped ROI 8* from reference images 3, a Gen6D detector D computes a map 9 of detection scores. Filtering with the ROI 8 yields a map 9*a*. The Gen6D detector D produces a pixel-wise location map that yields predicted translation T of the target object 2 in the test image 1. At the same time, from the predicted ROI 8 of the test image 1, a Gen6D selector S predicts the rotation R of the target object 2 in the test image 1. The translations T and the rotations R form an estimate of the pose 2*a* of the target object 2 in the test image 1.

In the refinement module C, the estimated pose 2*a* and the map 9*a* of detection scores in the ROI 8 are fed to a refiner REF. Based on a pixel in this map 9*a* with a highest detection score, the refiner REF produces a refined estimate 2*a*'. By then optimizing the rotations R and translations T again using ICP according to steps 187 and 188 of the method 100, a further refinement 2*a*" is obtained.

Figure 3:
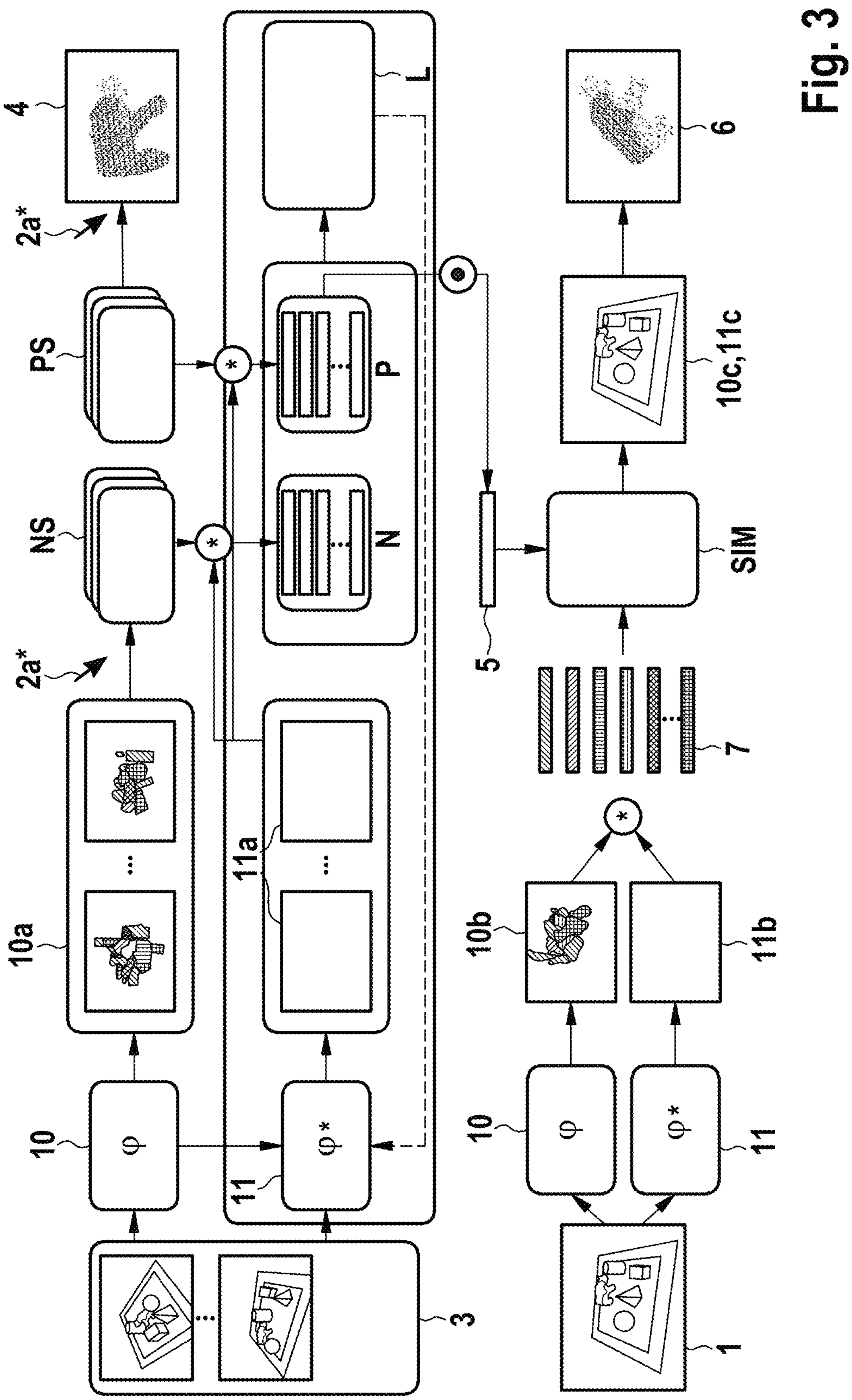
FIG. 3 shows a more detailed illustration of the computation of the object model 4, representation 5 of the target object 2, and local reconstruction 6.

FIG. 3 illustrates in more detail how the object model 4, the representation 5 of the target object 2, and the local representation 6 of the target object 2 are computed.

When the coarse segmentor φ, 10 is used on the reference images 3, in combination with the pose annotations 2*a of the reference images 3, the output 10***a* of the coarse segmentor φ, 10 divides the reference images 3 into negative segments NS that do not belong to the target object 2, and positive segments PS that do belong to the target object 2. Outputs 11*a* obtained on the same references images 3 using the dense segmentor φ*, 11 are averaged over each negative segment NS and each positive segment PS to yield a respective negative object level representation N or positive object level representation P. Starting from a copy of the coarse segmentor φ, 10, the dense segmentor φ* is trained using a contrastive loss function for maximum pairwise similarity between positive object level representations P on the one hand, and maximum pairwise dissimilarity between a positive object level representation P and a negative object level representation N on the other hand. After the few-shot training on the reference images 3, the dense segmentor φ*, 11 produces positive object level representations P that can be aggregated (e.g., averaged) to a representation 5 of the target object 2.

When the coarse segmentor φ, 10 is used on the input image 1, a map 10*b* of patches belonging to different objects results. At the same time, the trained dense segmentor φ*, 11 produces dense features for every pixel. These dense features 11*b* are averaged over each patch from the map 10*b* to yield a respective candidate representation 7. By evaluating the similarity SIM between candidate representations 7 and the representation 5 of the target object 2, it can be determined which parts 10*c*, 10*c* of the segmentor outputs 10*b*, 11*b* belong to the target object 2. Out of these parts, the local reconstruction 6 of the target object 2 is determined.

What is claimed is:

1. A method for determining a pose of a target object in an input image, the method comprising the following steps:

providing a set of reference images that contain the target object and are each annotated with a respective pose of the target object;

inputting the reference images to at least one segmentor that is configured to distinguish parts and/or features of an image belonging to different objects, wherein the at least one segmentor includes: a first, coarse segmentor that is configured to determine sets of pixels of the image belonging to different objects, and a second, dense segmentor that is configured to determine a set of features for each pixel of the image;

determining, from output of the at least one segmentor, a canonical object model that pools information from the reference images in one common coordinate system;

determining, from the output of the at least one segmentor in combination with the annotations of the reference images, a representation of the target object in the output space of at least one segmentor, wherein the determining of the representation of the target object includes:

determining, for each set of pixels belonging to an object according to the coarse segmentor, based on the annotation of the respective reference image, whether this set of pixels belongs to the target object, when the set of pixels belongs to the target object, computing an aggregate of features outputted by the dense segmentor over all pixels in the set as a positive object-level representation, and computing an aggregate of the positive object level representations as the representation of the target object;

inputting the input image to the at least one segmentor, and determining, based on a comparison of a resulting output of the at least one segmentor and the representation of the target object, which parts of the resulting output of the at least one segmentor belong to the target object;

combining the parts belonging to the target object into a local reconstruction of the target object; and evaluating, from a comparison of the local reconstruction and the canonical object model, a sought pose of the target object in the input image.

2. The method of claim 1, further comprising: optimizing parameters that characterize a behavior of the dense segmentor towards a goal of maximizing a pairwise similarity between the positive object level representations.

3. The method of claim 2, wherein the optimizing starts from a copy of the coarse segmentor.

4. The method of claim 1, wherein the comparison of the resulting output of the at least one segmentor obtained for the input image and the representation of the target object includes:

computing, for each set of pixels belonging to an object according to the coarse segmentor, an aggregate of the features outputted by the dense segmentor over all pixels in the set as a candidate representation;

evaluating a similarity between each candidate representation and the representation of the target object; and determining the candidate representation for which the similarity is highest as a part of the output of the segmentor that belongs to the target object.

5. The method of claim 1, wherein the evaluating of the sought pose includes:

determining, based at least in part on the canonical object model and the local reconstruction, a region of interest in the input image that is most salient for the evaluating of the sought pose; and preferring the determined region of interest in the evaluation of the sought pose.

6. The method of claim 1, further comprising:

applying parametrized rotations and/or translations to the canonical object model, and/or to the local reconstruction; and optimizing parameters of the rotations and/or translations towards a goal of improving a match between the canonical object model and the local reconstruction.

7. The method of claim 5, wherein the region of interest is determined based at least in part on:

an estimate of a diameter of the target object derived from the canonical object model;

an optimal translation perpendicular to an image plane; and a focal length of a camera used to acquire the input image.

8. The method of claim 5, wherein the evaluating of the sought pose further comprises:

computing, using a given object detector, a map of detection scores in the determined region of interest; and updating the determined pose based on a pixel in the map of detection scores with a highest detection score.

9. The method of claim 8, further comprising:

applying parametrized rotations and/or translations to the canonical object model, and/or to the local reconstruction; and optimizing parameters of the rotations and/or translations towards a goal of improving a match between the canonical object model and the local reconstruction;

further optimizing the parameters of the rotations and/or translations towards the goal of improving a match between the object model and the local reconstruction; and updating the determined pose based on an outcome of the further optimizing.

10. The method of claim 1, further comprising:

computing, from the sought pose, an actuation signal; and actuating, using the actuating signal: a vehicle, and/or a robot, and/or a driving assistance system, and/or a surveillance system, and/or a quality assurance system, and/or a medical imaging system.

11. A non-transitory machine-readable data carrier on which is stored a computer program for determining a pose of a target object in an input image, the computer program, when executed by one or more computers and/or compute instances, cause the one or more computers and/or compute instances to perform the following steps:

providing a set of reference images that contain the target object and are each annotated with a respective pose of the target object;

inputting the reference images to at least one segmentor that is configured to distinguish parts and/or features of an image belonging to different objects, wherein the at least one segmentor includes: a first, coarse segmentor that is configured to determine sets of pixels of the image belonging to different objects, and a second, dense segmentor that is configured to determine a set of features for each pixel of the image;

determining, from output of the at least one segmentor, a canonical object model that pools information from the reference images in one common coordinate system;

determining, from the output of the at least one segmentor in combination with the annotations of the reference images, a representation of the target object in the output space of at least one segmentor, wherein the determining of the representation of the target object includes:

determining, for each set of pixels belonging to an object according to the coarse segmentor, based on the annotation of the respective reference image, whether this set of pixels belongs to the target object, when the set of pixels belongs to the target object, computing an aggregate of features outputted by the dense segmentor over all pixels in the set as a positive object-level representation, and computing an aggregate of the positive object level representations as the representation of the target object;

inputting the input image to the at least one segmentor, and determining, based on a comparison of a resulting output of the at least one segmentor and the representation of the target object, which parts of the resulting output of the at least one segmentor belong to the target object;

combining the parts belonging to the target object into a local reconstruction of the target object; and evaluating, from a comparison of the local reconstruction and the canonical object model, a sought pose of the target object in the input image.

12. One or more computers including a non-transitory machine-readable data carrier on which is stored a computer program for determining a pose of a target object in an input image, the computer program, when executed by the one or more computers, cause the one or more computers to perform the following steps:

providing a set of reference images that contain the target object and are each annotated with a respective pose of the target object;

inputting the reference images to at least one segmentor that is configured to distinguish parts and/or features of an image belonging to different objects, where in the at least one segmentor includes: a first, coarse segmentor that is configured to determine sets of pixels of the image belonging to different objects, and a second, dense segmentor that is configured to determine a set of features for each pixel of the image;

determining, from output of the at least one segmentor, a canonical object model that pools information from the reference images in one common coordinate system;

determining, from the output of the at least one segmentor in combination with the annotations of the reference images, a representation of the target object in the output space of at least one segmentor, wherein the determining of the representation of the target object includes:

determining, for each set of pixels belonging to an object according to the coarse segmentor, based on the annotation of the respective reference image, whether this set of pixels belongs to the target object, when the set of pixels belongs to the target object, computing an aggregate of features outputted by the dense segmentor over all pixels in the set as a positive object-level representation, and computing an aggregate of the positive object level representations as the representation of the target object;

inputting the input image to the at least one segmentor, and determining, based on a comparison of a resulting output of the at least one segmentor and the representation of the target object, which parts of the resulting output of the at least one segmentor belong to the target object;

combining the parts belonging to the target object into a local reconstruction of the target object; and evaluating, from a comparison of the local reconstruction and the canonical object model, a sought pose of the target object in the input image.

* * * * *